US007549224B2

(12) United States Patent
Obert et al.

(10) Patent No.: US 7,549,224 B2
(45) Date of Patent: Jun. 23, 2009

(54) METHODS OF MAKING SLOTTED SUBSTRATES

(75) Inventors: Jeffrey S. Obert, Corvallis, OR (US); Thomas H. Ottenheimer, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 11/450,572

(22) Filed: Jun. 9, 2006

(65) Prior Publication Data

US 2006/0225279 A1 Oct. 12, 2006

Related U.S. Application Data

(62) Division of application No. 10/686,231, filed on Oct. 15, 2003, now Pat. No. 7,083,268.

(51) Int. Cl.
*B23P 17/00* (2006.01)

(52) U.S. Cl. .......................... 29/890.1; 29/611; 347/65; 347/63; 216/27

(58) Field of Classification Search ................ 29/890.1, 29/830, 831, 832, 611; 347/65, 63, 92–95, 347/50; 216/27, 41, 42, 44, 46, 52; 438/21
See application file for complete search history.

(56) References Cited

U.S. PATENT DOCUMENTS

| | | | | |
|---|---|---|---|---|
| 4,611,219 | A * | 9/1986 | Sugitani et al. | 347/40 |
| 4,680,859 | A | 7/1987 | Johnson | |
| 4,789,425 | A * | 12/1988 | Drake et al. | 216/27 |
| 5,723,053 | A * | 3/1998 | Momose et al. | 216/27 |
| 5,847,725 | A * | 12/1998 | Cleland et al. | 347/20 |
| 6,237,443 | B1 * | 5/2001 | Liedschreiber | 76/88 |
| 6,322,206 | B1 * | 11/2001 | Boyd et al. | 347/85 |
| 6,343,857 | B1 | 2/2002 | Cowger | |
| 6,482,574 | B1 * | 11/2002 | Ramaswami et al. | 430/320 |
| 6,527,368 | B1 * | 3/2003 | Giri et al. | 347/44 |
| 6,561,632 | B2 * | 5/2003 | Feinn et al. | 347/65 |
| 6,648,454 | B1 * | 11/2003 | Donaldson et al. | 347/65 |

* cited by examiner

*Primary Examiner*—Minh Trinh
*Assistant Examiner*—Tai Nguyen

(57) ABSTRACT

The described embodiments relate to slotted substrates and methods of making the slotted substrates. One exemplary method patterns a first set of dummy features in a first layer positioned over a first surface of a substrate and patterns a second set of dummy features in a second layer positioned over the first layer. After the method patterns the first set of dummy features and the second set of dummy features, the method further forms a slot in the substrate, at least in part, by allowing an etchant to pass through the first and second sets of dummy features to the first surface.

22 Claims, 10 Drawing Sheets

METHODS OF MAKING SLOTTED SUBSTRATES

CROSS-REFERENCE TO RELATED APPLICATIONS

This is a divisional of U.S. patent application Ser. No. 10/686,231 entitled "Slotted substrates and methods of making," filed Oct. 15, 2003, now U.S. Pat. No. 7,083,268 by Obert et al., and assigned to the present assignee.

BACKGROUND

Many types of printing devices employ print cartridges in the printing process. Print cartridges should operate reliably to ensure proper functioning of a printing device. Further, failure of print cartridges during manufacture increases production costs. Print cartridge failure can be brought about by a failure of the print cartridge components including print head(s).

Print heads and other fluid-ejecting devices often incorporate a slotted substrate in their construction. Currently, the slotted substrates can have a propensity to suffer failures due to, among other things, cracking of substrate material proximate a slot. Such failures lead to product malfunctions that can decrease product reliability and lessen customer satisfaction, while at the same time, increase production costs. For these and other reasons, there is a need fort the present invention.

BRIEF DESCRIPTION OF THE DRAWINGS

The same components are used throughout the drawings to reference like features and components wherever possible. Alphabetic suffixes are used to distinguish various embodiments.

DETAILED DESCRIPTION

The embodiments described below pertain to methods and systems for forming microelectromechanical ("MEMS") devices. Examples of such MEMS devices can comprise print heads and/or print heads incorporated as a component of a print cartridge, as well as other fluid ejecting devices such as a Lab-On-A-Chip, among other devices. Lab-On-A-Chip can be utilized in the laboratory setting to accurately dispense various fluids such as reagents.

Several embodiments of the inventive concepts will be described in the context of exemplary print heads and exemplary methods of forming print heads.

One exemplary print head can comprise a substrate having an elongate fluid handling slot ("slot") formed between first and second generally opposing substrate surfaces. The slot can supply fluid which can be supplied to multiple ejection chambers via fluid-feed passageways. Fluid can be selectively ejected from individual ejection chambers through a firing nozzle defined in an orifice layer or orifice plate overlying the ejection chamber.

The slot configuration can influence the strength characteristics of the slotted substrate. Substrate material adjacent the slot and proximate the first surface can be exposed to stress forces which can lead to cracking and eventual failure of the substrate. Some of the described embodiments comprise slotted substrates which have tapered elevational profiles which can reduce stress concentrations at the first surface.

Figure 1:
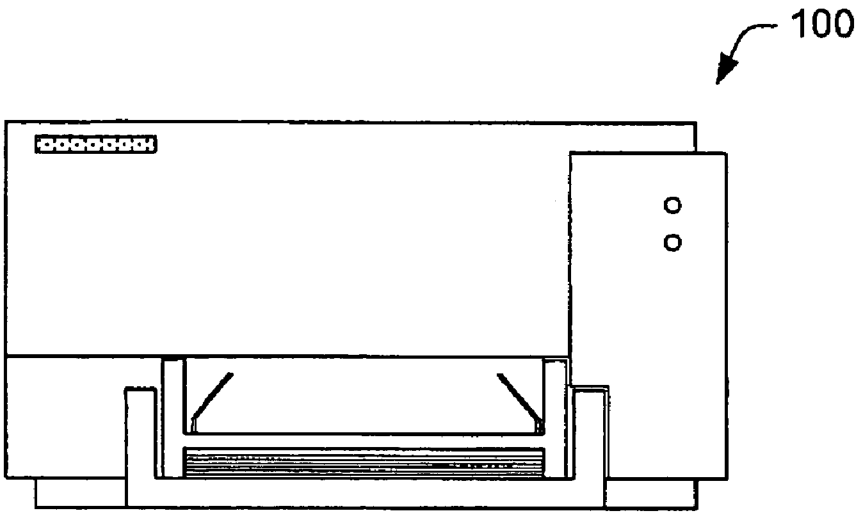
FIG. 1 shows a front elevational view of an exemplary printer in accordance with one embodiment.

FIG. 1 shows an exemplary printing device that can utilize an exemplary print cartridge. In this embodiment, the printing device comprises a printer 100. The printer shown here is embodied in the form of an inkjet printer. The printer 100 can be capable of printing in black-and-white and/or color. The term "printing device" refers to any type of printing device and/or image forming device that employs slotted substrate(s) to achieve at least a portion of its functionality. Examples of such printing devices can include, but are not limited to, printers, facsimile machines, and photocopiers. In this exemplary printing device, the slotted substrates comprise a portion of a print head which is incorporated into a print cartridge, an example of which is described below.

Figure 2:
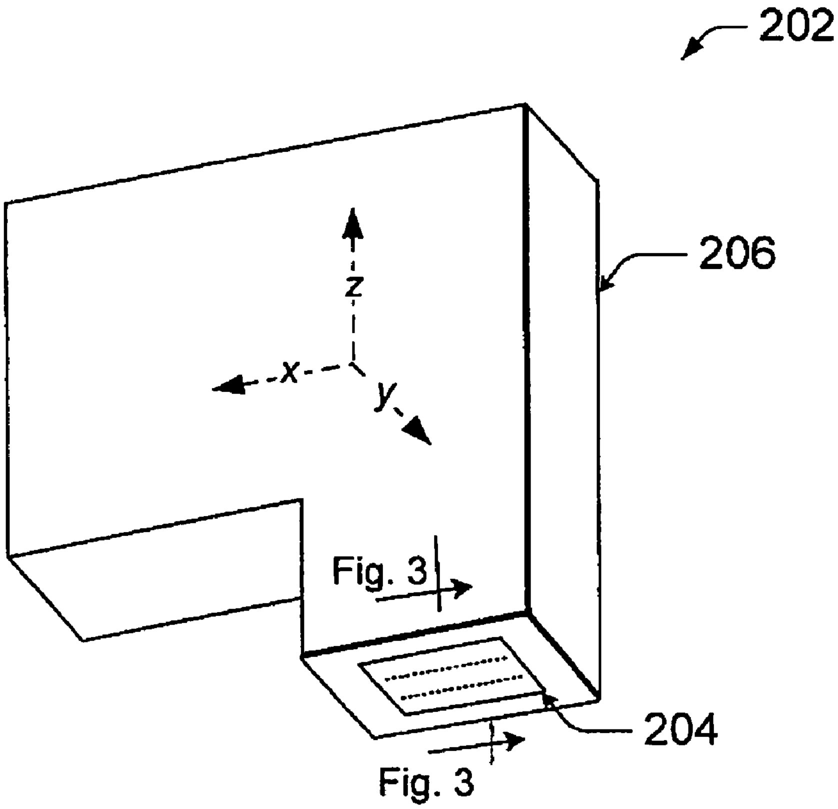
FIG. 2 shows a perspective view of a print cartridge in accordance with one embodiment.

FIG. 2 shows an exemplary print cartridge 202 that can be utilized in an exemplary printing device. The print cartridge is comprised of a print head 204 and a cartridge body 206 that supports the print head. Though a single print head 204 is illustrated on this print cartridge 202 other exemplary configurations may employ multiple print heads on a single cartridge.

Print cartridge 202 is configured to have a self-contained fluid or ink supply within cartridge body 206. Other print cartridge configurations may alternatively or additionally be configured to receive fluid from an external supply. Other exemplary configurations will be recognized by those of skill in the art.

Figure 3:
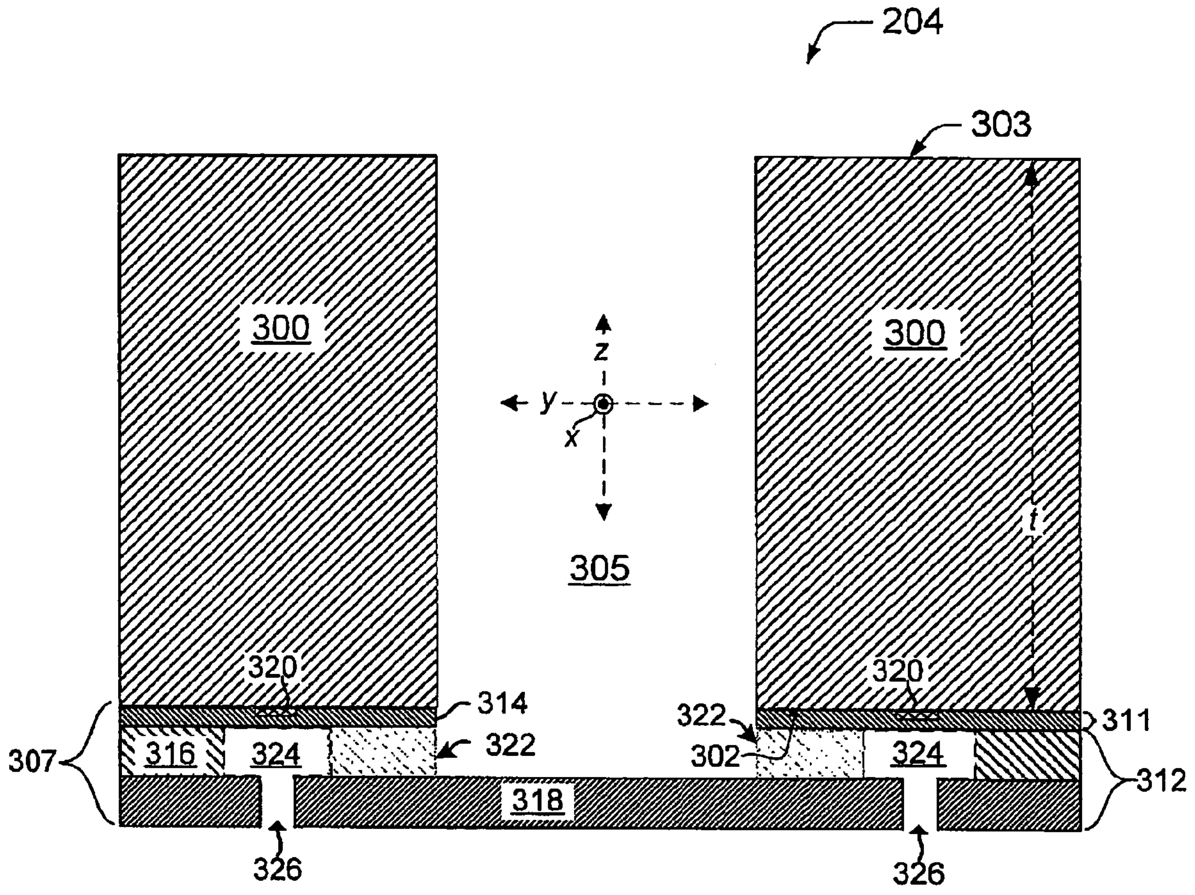
FIG. 3 shows a cross-sectional representation of a portion of the print cartridge shown in FIG. 2 in accordance with one embodiment.

FIG. 3 shows a cross-sectional diagrammatic representation of a portion of the exemplary print head 204, taken along line 3-3 in FIG. 2. The view of FIG. 3 is taken transverse a long axis x of a slot 305 (described below), the long axis extending into and out of the plane of the page upon which FIG. 3 appears. Here a substrate 300 extends between a first substrate surface ("first surface") 302 and a second substrate surface ("second surface") 303 to define a thickness t there between. As will be described in more detail below, forces experienced by the substrate 300 during processing and operation can be concentrated in and around the substrate material proximate first surface 302. The described embodiments can reduce stress concentrations within particular regions. of the substrate material, notably those in and around the substrate material proximate first surface 302. Here a slot 305 passes through substrate 300 between first and second surfaces 302, 303.

In this particular embodiment substrate 300 comprises silicon which can be either doped or undoped. Other suitable substrate materials can include, but are not limited to, gallium arsenide, gallium phosphide, indium phosphide, or other crystalline material suitable for supporting overlying layers.

Substrate thicknesses t can have any suitable dimensions appropriate for the substrate's intended applications. In some embodiments, substrate thicknesses taken relative to the z-direction can range from less than 100 microns to more than 2000 microns. One exemplary embodiment can utilize a substrate that is approximately 675 microns thick. Though a single substrate is discussed herein, other suitable embodiments may comprise a substrate that has multiple components during assembly and/or in the finished product. For example one such embodiment may employ a substrate having a first component and a second sacrificial component which is discarded at some point during processing.

A layer assembly 307 comprising one or more layers is formed over the substrate's first surface 302. In some embodiments, layer assembly 307 comprises a first sub-assembly 311 of one or more layers, and a second sub-assembly 312 of one or more layers. In this particular example, first sub-assembly 311 comprises one or more thin-film layers 314, and second sub-assembly 312 comprises one or more thick-film layers, which in one embodiment comprise a photo-imagable polymer. Other suitable examples are provided below. In at least one embodiment the second sub-assembly 312 comprises a barrier layer 316 and an orifice plate or orifice layer 318.

In one embodiment, one or more thin-film layers 314 can comprise one or more conductive traces (not shown) and electrical components such as resistors 320. Individual resistors can be selectively controlled by a controller such as a processor, via the electrical traces. Thin-film layers 314 can in some embodiments also define, at least in part, a wall or surface of multiple fluid-feed passageways 322 through which fluid can pass. Thin-film layers 314 can comprise among others, a field or thermal oxide layer. Barrier layer 316 can define, at least in part, multiple firing chambers 324. In some embodiments, barrier layer 316 may, in combination with thin-film layers 314, define fluid-feed passageways 322. Orifice layer 318 can define multiple firing nozzles 326. Individual firing nozzles can be respectively aligned with individual firing chambers 324 in some embodiments.

Barrier layer 316 and orifice layer 318 can be formed in any suitable manner. In one particular implementation both barrier layer 316 and orifice layer 318 comprise thick-film material, such as a photo-imagable polymer material. The photo-imagable polymer material can be applied in any suitable manner. For example, the material can be "spun-on" as will be recognized by the skilled artisan.

After being "spun-on", barrier layer 316 then can be patterned to form, at least in part, desired features therein. Examples of suitable patterns will be described below. In one embodiment patterned areas of the barrier layer can be filled with a sacrificial material in what is commonly referred to as a 'lost wax' process. In this embodiment orifice layer 318 can be comprised of the same material as the barrier layer and be formed over barrier layer 316. In one such example, orifice layer material is 'spun-on' over the barrier layer. Orifice layer 318 then can be patterned as desired to form nozzles 326 over respective chambers 324. The sacrificial material then is removed from the barrier layer's chambers 324 and passageways 322.

In another embodiment barrier layer 316 comprises a thick-film, while the orifice layer 318 comprises an elctroformed nickel material. Other suitable embodiments may employ an orifice layer which performs the functions of both a barrier layer and an orifice layer.

In operation, fluid such as ink can enter slot 305 from the cartridge body, shown in FIG. 2. Fluid then can flow through individual passageways 322 into an individual chamber 324. Fluid can be ejected from the chamber when an electrical current is passed through an individual resistor 320. The electrical current can heat the resistor sufficiently to heat some of the fluid contained in the firing chamber to its boiling point so that it vaporizes causing a portion of the fluid to eject from a respectively positioned nozzle 326. The ejected fluid can then be replaced by additional fluid from passageway 322.

Figure 4:
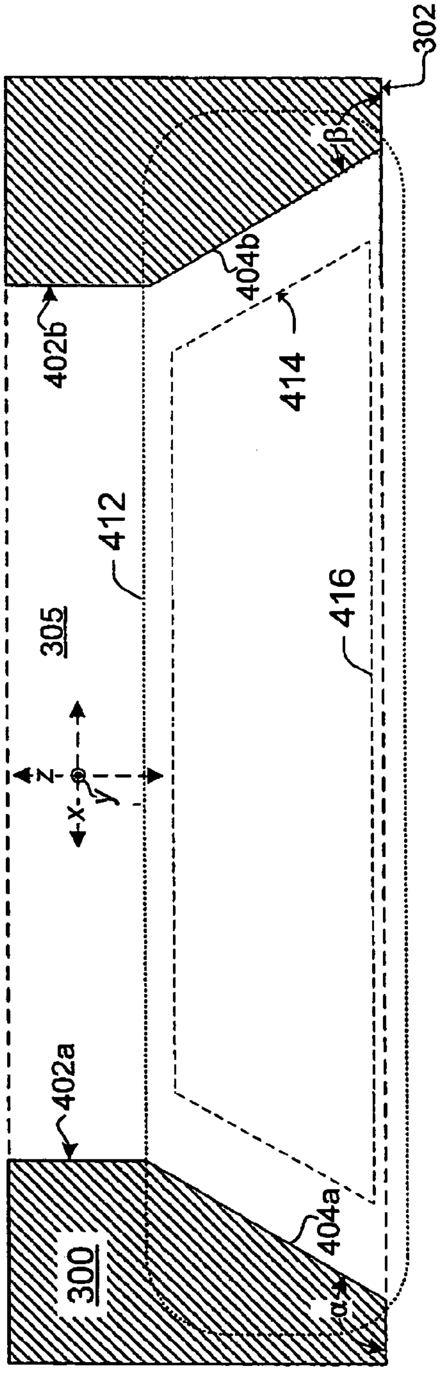
FIGS. 4-6 each show a side-sectional representation of a portion of an exemplary substrate in accordance with one embodiment.

FIG. 4 shows a diagrammatic representation of a side-sectional view of substrate 300. The view in FIG. 4 constitutes a view similar to the view of FIG. 3, but is taken along long axis x rather than transverse the long axis.

In this embodiment slot 305 is defined, at least in part, by two generally oppositely positioned endwalls 402*a*, 402*b*. Individual endwalls have an endwall portion 404*a*, 404*b* which joins with first surface 302 at an obtuse angle $\alpha$, $\beta$ respectively, as measured through the substrate material.

In this particular embodiment, each of endwall portions 404*a*, 404*b* define a single generally planar surface. Other suitable embodiments may have individual endwall portions which comprise multiple faceted surfaces which join with the first surface at an obtuse angle. Obtuse end-wall angles at first surface 302 can reduce stress concentrations and resultant cracking of the substrate material as compared with acute and right angle configurations.

In the embodiment depicted in FIG. 4 slot 305 has a region 412 which approximates a portion of a trapezoid as indicated generally by designator 414. Here the longest side of the trapezoid is designated at 416 and is positioned proximate first surface 302. Each of the shortest sides of the trapezoid is defined by a respective endwall portion 404*a*, 404*b*. Put another way, slot 305 has a generally tapered elevational profile portion which, in this particular embodiment, is defined by end wall portions 404*a*, 404*b*. The tapered profile portion starts proximate the substrate's first surface 302 and tapers generally inwardly into the substrate, along endwall portions 404*a*, 404*b*, respectively.

Figure 5:
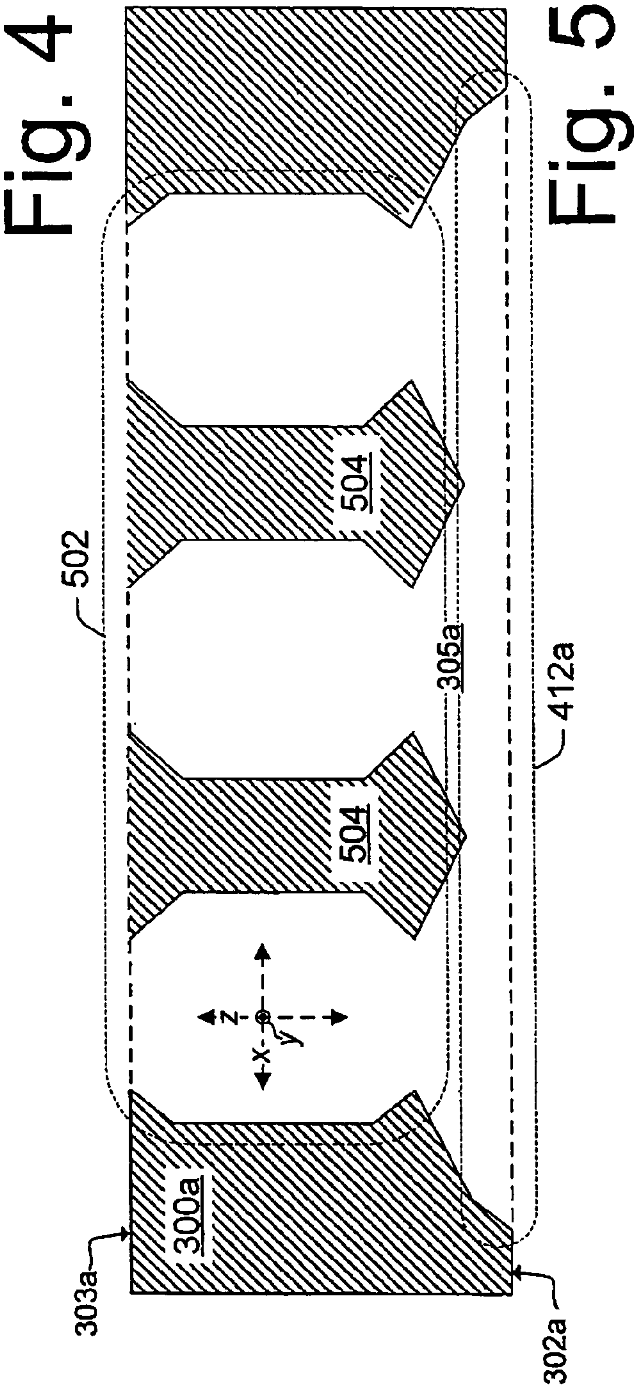

FIG. 5 illustrates another diagrammatic representation of a side-sectional view similar to that represented in FIG. 4. Like the substrate depicted in FIG. 4, a region 412*a* of slot 305*a* approximates a portion of a trapezoid. In this embodiment region 412*a* is generally continuous in the x direction. That is in this embodiment, the region 412*a* does not pass through a meaningful amount of substrate material, if any. In this embodiment slot 305*a* also comprises a generally discontinuous region 502. Here the discontinuity of region 502 is defined by virtue of the fact that one or more substrate material reinforcement structures 504 extend across slot 305*a* in a direction that is generally parallel to the short axis y. In this embodiment two reinforcement structures 504 are shown to extend across or within slot 305*a*. Other suitable embodiments can have fewer or more reinforcement structures.

In some applications the reinforcement structures can lend structural support to the substrate. This structural support can help to maintain the planarity of the substrate's first and second surfaces 302*a*, 303*a* both during and after the slotting process. Additionally, the reinforcement structures can contribute to a reduction in the propensity of the substrate to crack and to break as described above. Such advantages can be pronounced especially in connection with substrates that utilize multiple parallel slots. In these types of substrates the reinforcement structures can decrease deflection of the substrate material that remains between adjacent slots.

Figure 6:
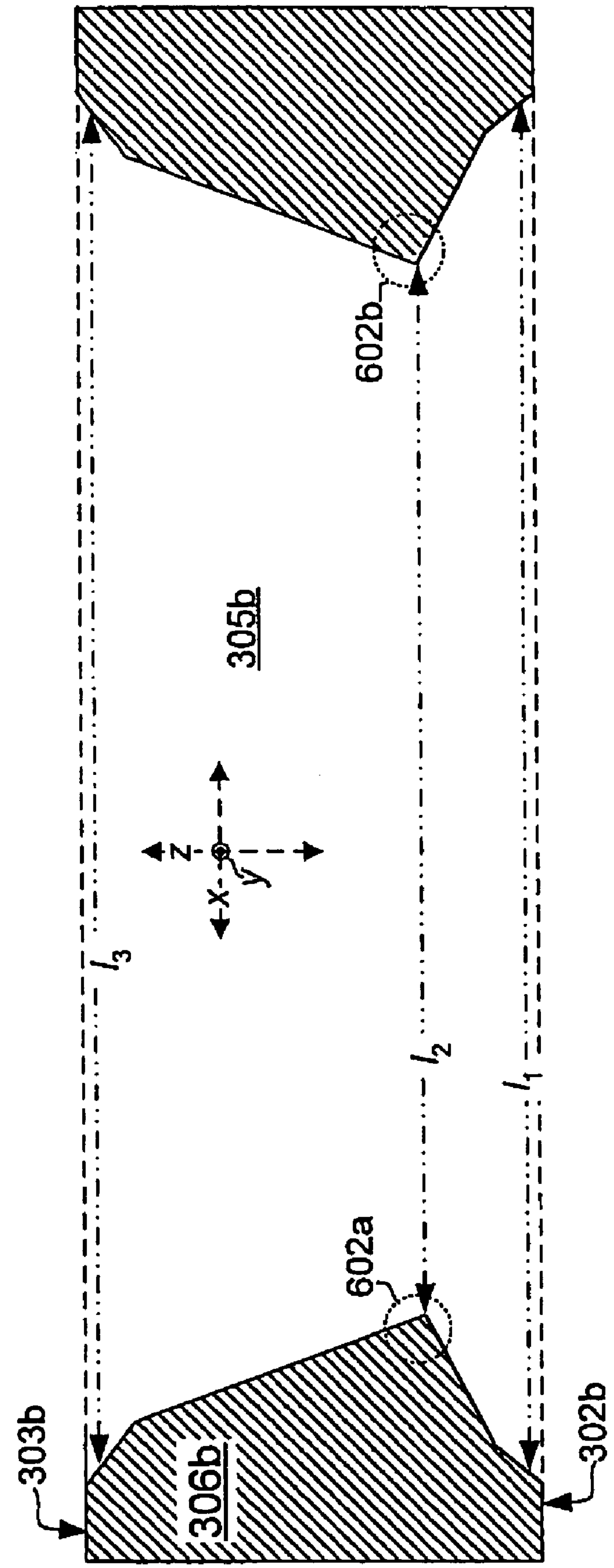

FIG. 6 illustrates another diagrammatic representation of a side-sectional view similar to that represented in FIGS. 4-5. In this embodiment slot 305*b* has a first length $l_1$ taken along first surface 302*b* and generally parallel to the slot's long axis x, and a second length $l_2$ spaced from, and generally parallel to the direction along which first length $l_1$ is measured. This embodiment also has a third length 13 taken proximate second surface 303*a* and generally parallel to the long axis x. In this instance first length $l_1$ is the maximum slot length and second length $l_2$ is the minimum slot length. In this embodiment substrate material 602*a* and 602*b* defining length $l_2$ is spaced from both the first and second surfaces 302*b*, 303*b* and as such may be exposed to less stress forces and resultant cracking than locations proximate to either the first or second surfaces.

Figure 7:
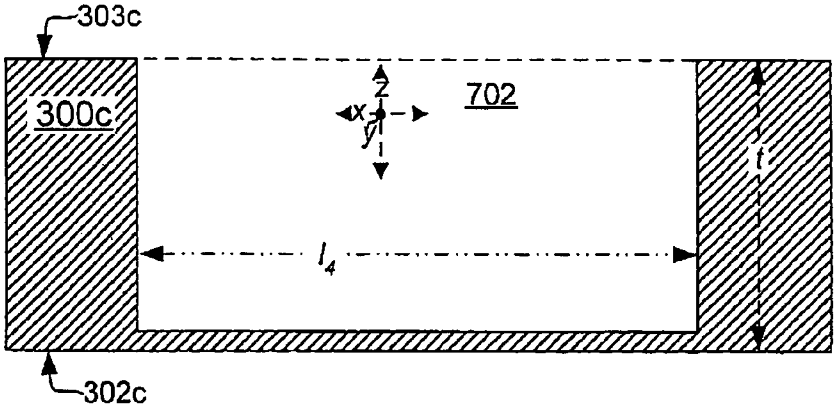
FIGS. 7, 7*h*, and 7*i* show side-sectional views of an exemplary substrate in accordance with one embodiment.
Figure 7A:
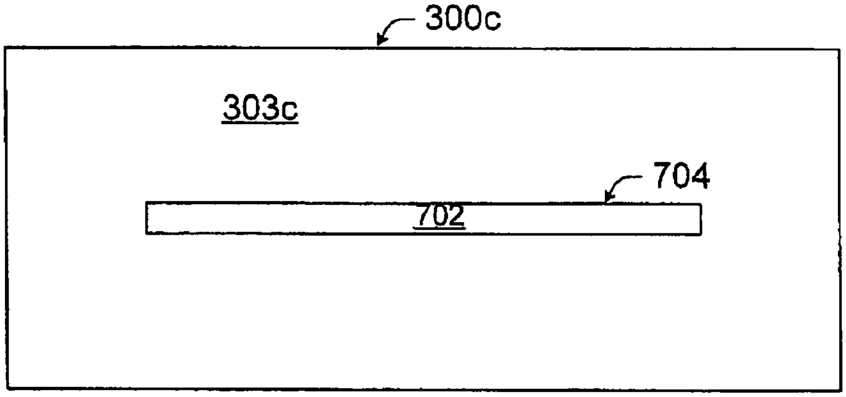
FIGS. 7*a*-7*g* show top views of an exemplary substrate in accordance with one embodiment.
Figure 7B:
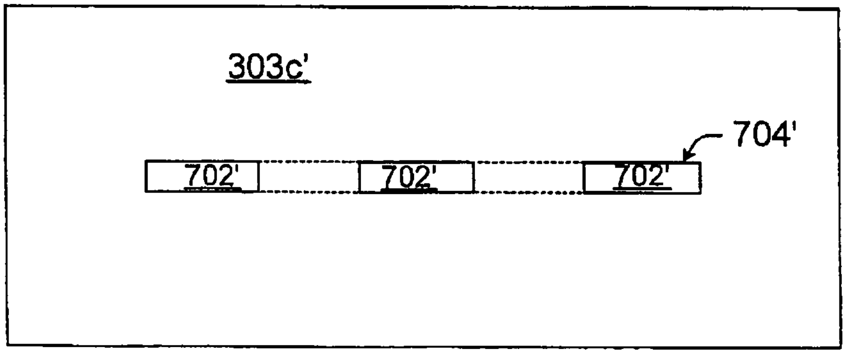
Figure 7C:
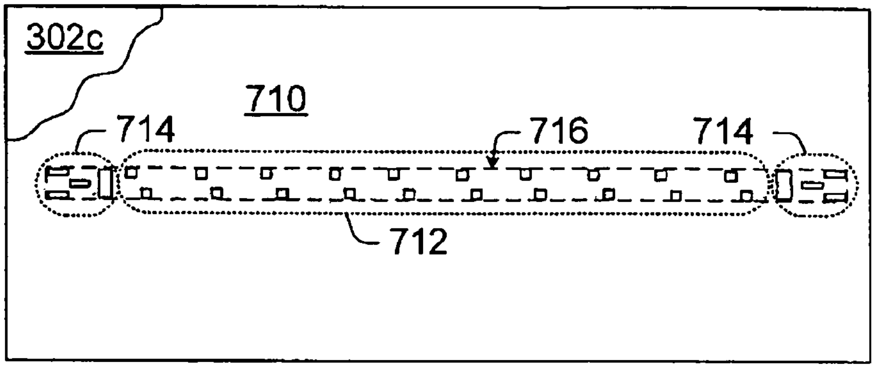
Figure 7D:
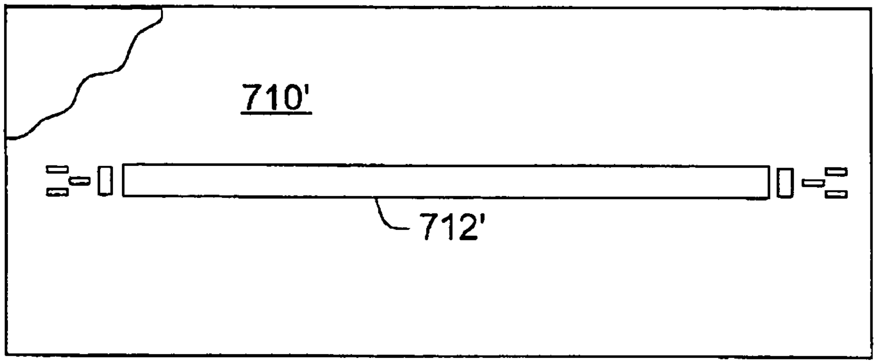
Figure 7E:
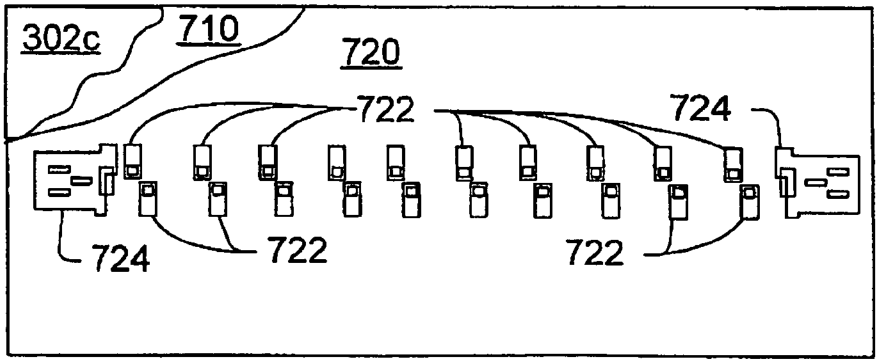
Figure 7F:
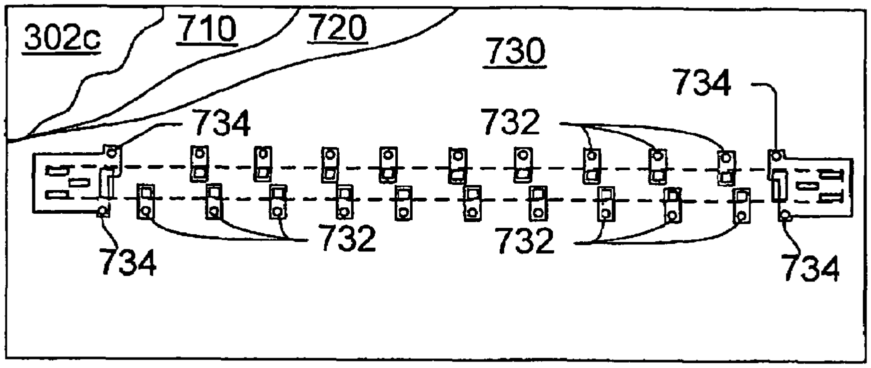
Figure 7G:
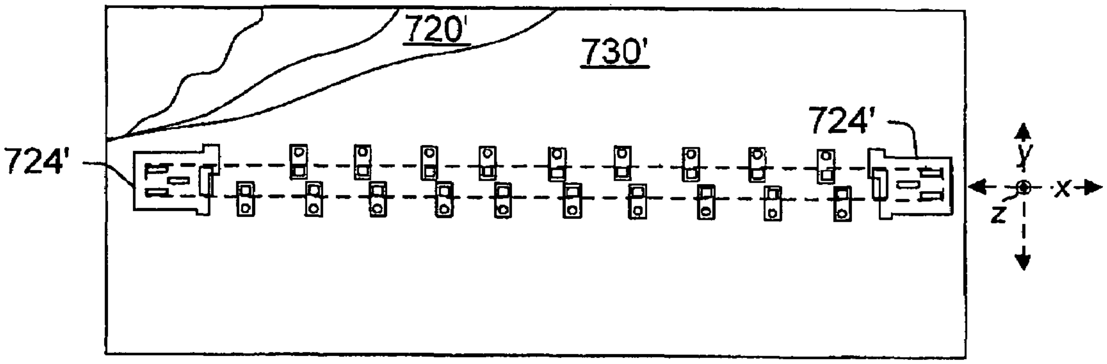
Figure 7H:
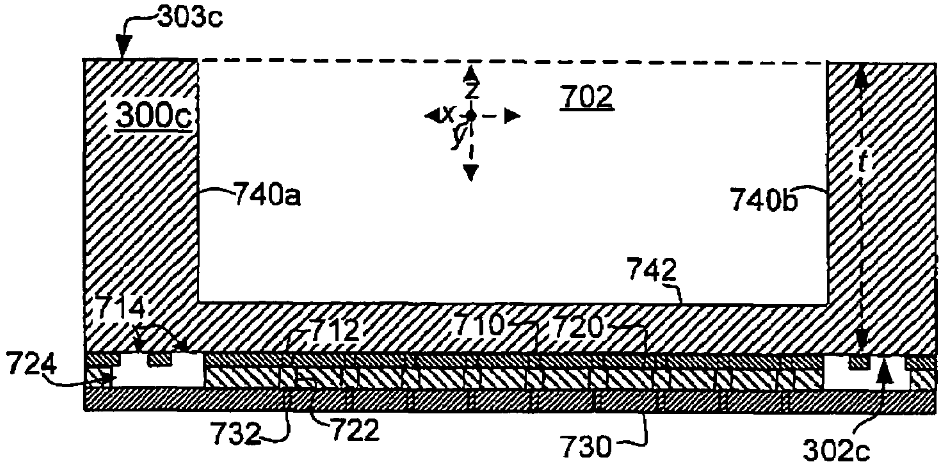
Figure 7I:
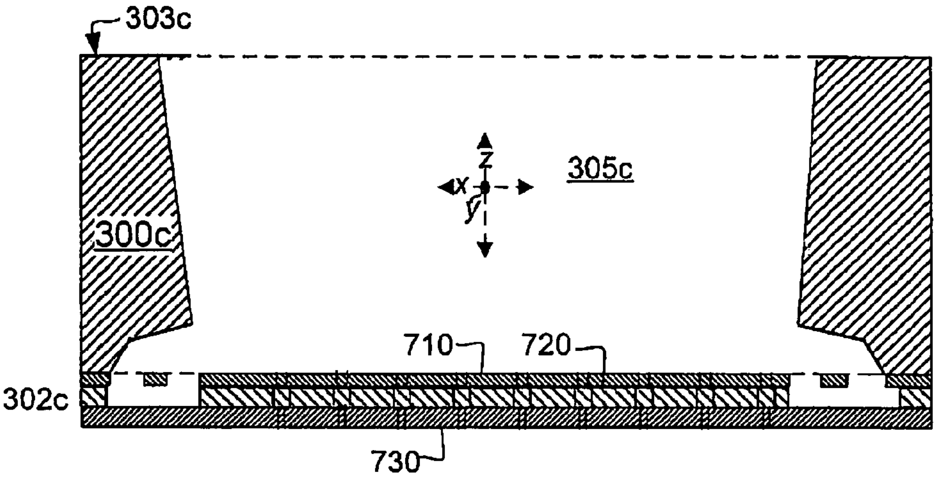

FIGS. 7-7*i* show process steps for forming an exemplary slotted substrate with a layer assembly formed thereon.

FIGS. 7 and 7*a* show diagrammatic representations of an exemplary substrate 300*c* having a slot portion 702 formed therein. FIG. 7 shows a side-sectional view, while FIG. 7*a* shows a top view of substrate 300*c* showing a footprint 704 of slot portion 702 at second surface 303*c*. In this particular embodiment slot portion 702 comprises a trench which does not extend through the entire thickness t of the substrate. In various exemplary embodiments, the slot portion's depth as a percentage of thickness t can range from less than about 50% to about 100%. In this example the slot portion is etched through about 90% of the substrate's thickness.

Slot portion 702 can be formed by any suitable technique including, but not limited to, laser machining, sand drilling, and mechanically contacting the substrate material. Mechanically contacting can include, but is not limited to, sawing with a diamond abrasive blade. In one suitable example slot portion 702 can be formed by patterning the slot portion's footprint 704 into a hardmask positioned over second surface 303*c*. Substrate material then can be removed by etching through the patterned hardmask. In some embodiments such etching can comprise alternating acts of etching and passivating. For example, a passivating material can be patterned over second surface 303*c*. A dry etching process then can remove exposed areas of substrate material. Passivating material can be applied to the newly etched region followed by another act of dry etching. In another example the feature can be formed by laser machining or sand drilling the feature into second surface 303*c*. Other embodiments may use a combination of these and/or other removal techniques to form the feature.

FIG. 7*b* shows an alternative footprint 704' where slot portion 702' comprises three separate or distinct regions separated by substrate material. Such a configuration can be utilized to form a slot which has reinforcement structures extending across the slot. For example, slot 303*b* shown in FIG. 5, has two such reinforcement structures 504.

Referring to FIG. 7*c*, a first layer 710 is formed over the substrate's first surface 302*c*. In this embodiment first layer 710 can correspond with thin-film layer 314 described in relation to FIG. 3. Multiple features or holes are patterned in first layer 710. In this embodiment the features comprise a first type of feature 712 and a second type of feature 714. First feature type 712 is similar to fluid delivery passageways 322 described in relation to FIG. 3. The similarity may become more evident in relation to FIG. 7*d* discussed below. Second feature type 714 comprises "dummy features" which are intended primarily to aid in the slot forming process, as will be described in more detail below.

In this embodiment the two types of features 712, 714 can be arranged in a pattern which generally approximates a footprint 716 of an exemplary slot at the first surface 302*c*.

Features types 712, 714 can be any suitable shape. For example, in the embodiment shown in FIG. 7*c*, some of the features of the individual feature types are rectangular (714) and some are square (712). Other suitable embodiments may use round, elliptical or irregularly shaped features, among others, and/or a combination of shapes. The shape, area, and/or relative positioning of the features can be selected to achieve an exemplary slot geometry as will be discussed in more detail below.

In an alternative embodiment a single feature of the first type 712 having a larger area may be utilized. FIG. 7*d* shows an example of such a configuration where first feature type 712' is patterned in first layer 710'.

Referring now to FIG. 7*e*, a second layer 72O is formed over first layer 710. Second layer 720 can correspond with barrier layer 316 described in relation to FIG. 3. Multiple features are patterned into second layer 720, so that individual features are respectively positioned to be in fluid-flowing relation with individual respective features 712 or 714 of first layer 710. The multiple features formed in second layer 720 comprise a first type 722 and a second type 724. First feature type 722 is similar to the ejection chambers 324 described in relation to FIG. 3. Second feature type 724 comprises "dummy features" which are intended primarily to aid in the slot forming process.

Referring now to FIG. 7*f*, a third layer 730 is formed over second layer 720. Third layer 730 can correspond with orifice layer 318 described in relation to FIG. 3. Multiple features are patterned into third layer 730, so that individual features are respectively positioned to be in fluid flowing relation with respective features 722 or 724 of second layer 720. The multiple features patterned into third layer 730 comprise a first type 732 and a second type 734. First feature type 732 can correspond with firing nozzles 326 described in relation to FIG. 3. Second feature type comprises "dummy features" or "dummy nozzles" which are intended primarily to aid in the slot forming process as will be described in more detail below.

In an alternative embodiment the features 732, 734 may be preformed in third layer 730 which is then positioned over second layer 720. In the embodiment shown in FIG. 7*f*, a feature 732 or 734 is formed in the third layer 730 to correspond to each feature 722 or 724 formed in second layer 720. In an alternative embodiment, there may be features 722, 724 in second layer 720 for which no corresponding feature 732, 734 is formed in the third layer. Such an example can be seen in FIG. 7*g* which has no features formed in third layer 730' which overlie second features 724' formed in second layer 720'.

FIGS. 7*h*-7*i* show side-sectional representations of substrate 300*c*. FIG. 7*h* is similar to FIG. 7 with the addition of first, second and third layers 710, 720, and 730 as described above. Features 712, 722, and 732 are shown for illustrative purposes though they may not actually lie in the plane of the diagram.

FIG. 7*i* shows substrate 300*c* after additional substrate material is removed to form a slot 305*c*. One suitable process for removing additional substrate material comprises exposing substrate 300*c* to an etchant. In the example shown here wet etching can be utilized.

Wet etching can be achieved, in one suitable process, by immersing substrate 300*c* into an anisotropic etchant for a period of time sufficient to form slot 305*c*. In one embodiment the substrate can be immersed in a suitable etchant such as TMAH (Tetramethylamoniumhydroxide) for a period of 1 ½ to 3 hours. In some suitable processes etchants may include any anisotropic wet etchant that is selective to hard masks and exposed thin-film and other layers. That is, the etchant etches substrate material but does not meaningfully etch hardmasks and/or exposed thin-film and other layers. In the process shown here a single act of wet etching is utilized to remove the substrate material. In other embodiments wet etching can comprise multiple acts of wet etching.

Immersing the substrate in the etchant causes the etchant to attack or to remove substrate material from exposed portions of the substrate. As mentioned above, a hard mask can be patterned over second surface 303*c* to control etching of that surface and/or to define the slot geometry proximate the second surface.

The etchant etches exposed substrate material including the endwalls 740*a*, 740*b* (FIG. 7*h*), sidewalls (not shown), and the bottom 742 (FIG. 7*h*). Etchant also may contact portions of the substrate's first surface 302*c* by passing through features formed in the first, second and third layers 710, 720, and 730.

The configuration of slot 305*c* can be affected by the size, shape, number and location of the features formed in the first, second, and/or third layers 710, 720, and 730. In this particular implementation etchant can pass through the respective first type features 712, 722, and 732 to contact the first surface 302*c*. As will be described in more detail below, in this embodiment, etchant cannot reach dummy features 714 until after the etchant has removed sufficient substrate material to enter these features and to begin etching first surface 302*c*. Such a configuration is but one suitable manner of affecting the profile of the finished slot. This and other examples will be described below.

FIGS. 8-8*a* and 9-9*a* show in a little more detail one example of how slot geometry can be affected by patterning the features in the different layers 710, 720 and 730. Specifically, slot end geometry can be affected by patterning dummy features 714, 724 and 734.

Figure 8:
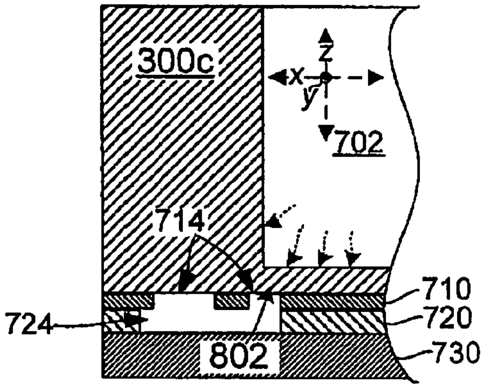
FIGS. 8-8*a* show side-sectional views of an exemplary substrate in accordance with one embodiment.
Figure 8A:
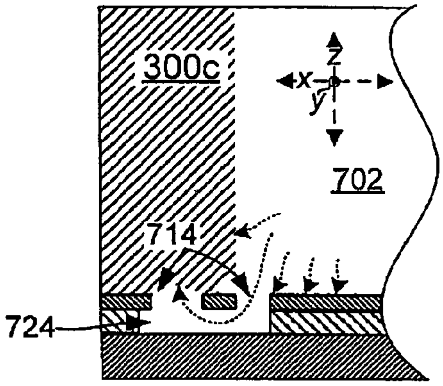

FIG. 8 is similar to the configuration shown in FIG. 7*h* where etchant, indicated by dashed arrows, is introduced and etches through a given amount of substrate material 802 before it can break through to reach dummy feature 724. Once the etchant reaches dummy feature 724, it can begin to etch a portion of first surface 302*c* exposed by dummy features 714. This creates somewhat of a delayed etch of the substrate material proximate dummy features 714 which is illustrated in FIG. 8*a*.

Figure 9:
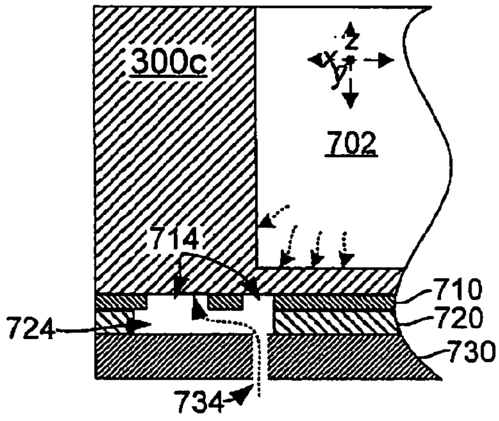
FIGS. 9-9*a* show side-sectional views of an exemplary substrate in accordance with one embodiment.
Figure 9A:
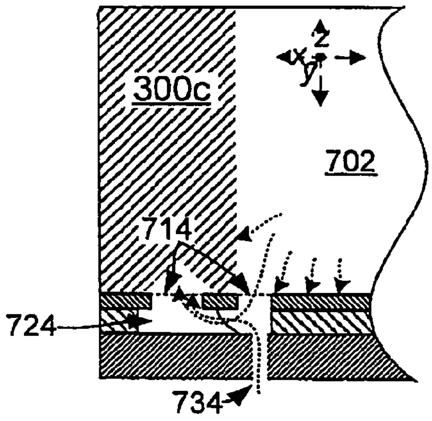

In contrast to FIGS. 8-8*a*, FIGS. 9-9*a* have a feature 734 in the form of a dummy nozzle which allows an etchant to attack first surface 302*c* as indicated in FIG. 9. This configuration allows relatively more time for the etchant to act on substrate material proximate dummy features 714. Accordingly, more of this substrate material is removed during an etching process of equal duration as the embodiment shown in FIGS. 8-8*a*.

FIGS. 10-10*e* and 11-11*b* show two additional embodiments which help to illustrate but one example of how the patterned features can affect slot geometry.

Figure 10:
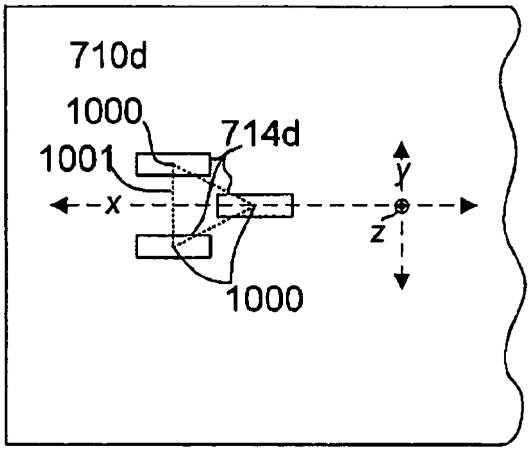
FIG. 10 shows a patterned layer in accordance with one embodiment.

FIG. 10 shows a group of three dummy features 714*d* formed into first layer 710*d*. This configuration is similar to the configuration shown in FIG. 7*c*. In this particular embodiment each of dummy features 714*d* defines a center 1000. The centers of the individual dummy features define a triangle 1001. In this particular embodiment the triangle comprises an isosceles triangle which is bisected by the slot's long axis which is indicated here by the x-axis. Utilizing three distinct features 714*d* as shown here can affect the shape of the finished slot as will be described in more detail below.

When etchant contacts substrate material through an individual dummy feature, etching will occur both laterally along the x and y-axes, and vertically along the z-axis to create a three-dimensional shape in the substrate.

Figure 10A:
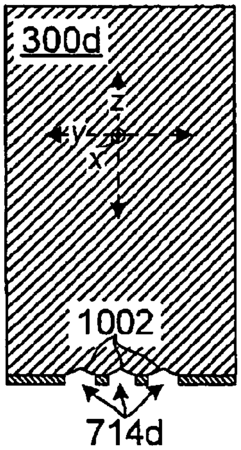
FIGS. 10*a*-10*c* show cross-sectional views of an exemplary substrate in accordance with one embodiment.
Figure 10B:
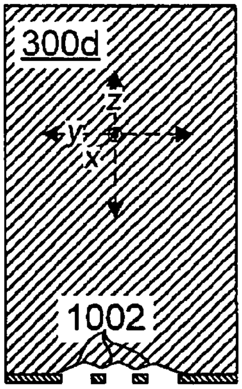
Figure 10C:
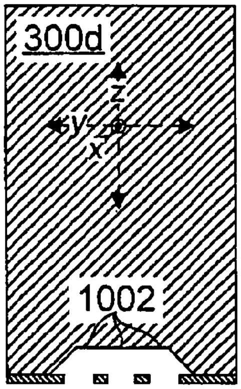

FIGS. 10*a*-10*c* show cross-sectional representations of a substrate 300*d* taken transverse a long axis of a slot with the long axis being represented by the x-axis which extends into and out of the page.

FIG. 10*a* depicts etch profiles 1002 formed a short time after an etchant contacts the substrate through dummy features 714*d*. In many of these embodiments the lateral rate of etching can exceed the vertical etch rate. Accordingly, the shape etched into the substrate will be relatively wide in comparison to its depth. In some embodiments the etching which occurs through an individual feature will create an inverted pyramidal shape into the substrate along the <111> plane of the substrate. In the two-dimensional view shown here, the pyramidal shape generally approximates a triangle. As etching continues, the etched shapes formed through the individual dummy features 714*d* may etch together to form an exemplary slot profile, an example of which is discussed below in relation to FIG. 10*d*.

FIG. 10*b* depicts an example where etch profiles 1002, after further etching activity relative to FIG. 10*a*, are forming a unitary etch profile that results in the joinder of the individual etched features.

FIG. 10*c* depicts further etching activity relative to FIG. 10*b*. As shown here, etching has progressed to the point that individual etch profiles are not readily distinguishable.

Figure 10D:
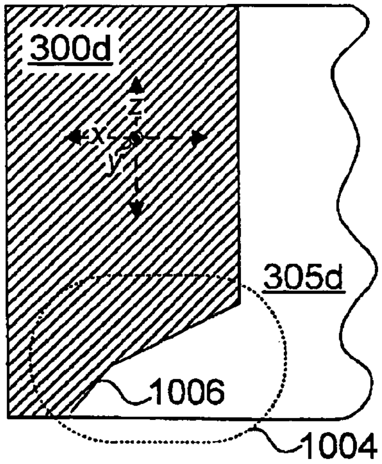
FIG. 10*d* shows a side-sectional view of an exemplary substrate in accordance with one embodiment.

FIG. 10*d* shows the embodiment of slot 305*d* shown in FIG. 10*c* in a view taken along the x-axis rather than transverse the x-axis. The etching process forms a slot end profile 1004 which is defined, at least in part, by end wall portion 1006. End wall portions are described in more detail above in relation to FIG. 4.

Figure 11:
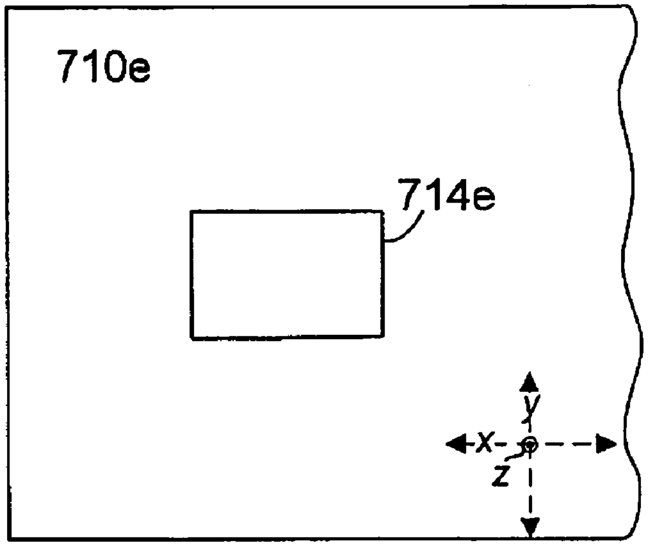
FIG. 11 shows a patterned layer in accordance with one embodiment.
Figure 11A:
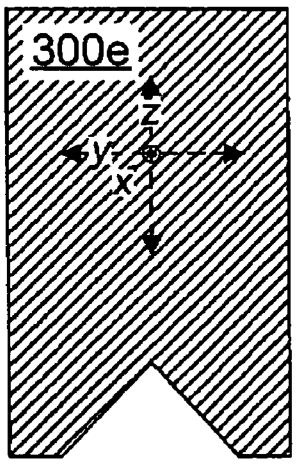
FIG. 11*a* shows a cross-sectional view of an exemplary substrate in accordance with one embodiment.
Figure 11B:
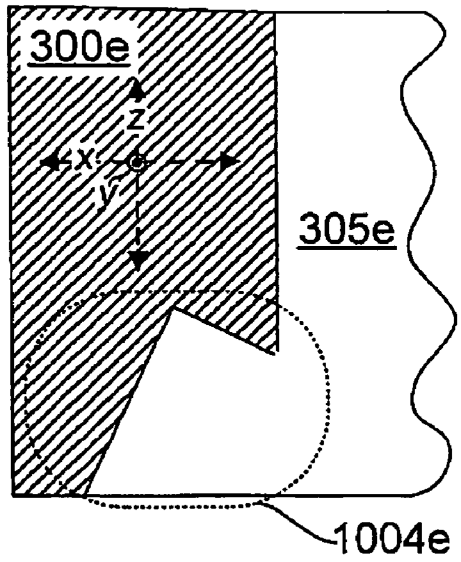
FIG. 11*b* shows a side-sectional view of an exemplary substrate in accordance with one embodiment.

Referring now to FIG. 11, a single dummy feature 714*e* is formed in first layer 710*e*. FIGS. 11*a*-11*b* are views similar to FIGS. 10*c* and 10*d* and show an alternative slot end profile 1004*e* formed by etching through feature 714*e* to form slot 305*e*. A comparison of FIGS. 10*c*-10*d* and 11*a*-11*b* illustrate how the relative size and number of the dummy features can be selected to influence the slot end profile.

The slot end profile can further be affected by the composition of the material contacting the substrate proximate a patterned feature. For example, the skilled artisan will recognize the differential etch rates along a thin-film substrate interface compared to an exposed substrate and/or a polymer substrate interface.

Several exemplary embodiments are described above where a first process can be utilized to remove substrate material to form a slot portion, and wet etching can be utilized to remove additional substrate material to achieve an exemplary slot profile. An exemplary slot profile or geometry can decrease stress concentrations on substrate material defining the slot ends. This can be pronounced especially on substrate material proximate to the first surface where stress forces may be highest. An exemplary slot profile can be achieved, among other ways, by etching through one or more dummy features. Such etching may form a slot end profile which is stronger than can otherwise be obtained.

Utilizing wet etching to finish the slot(s) can also increase the strength of the resultant slotted substrate by reducing sharp edges, comers, and other stress concentrating regions.

The described embodiments can form efficiently a slotted substrate having an exemplary slot configuration. The slot configuration can be less prone to cracking and thereby can reduce failure of the slotted substrate to properly deliver fluid when incorporated into a print cartridge and/or other MEMS devices.

Although the inventive concepts have been described in language specific to structural features and methodological steps, it is to be understood that the inventive concepts defined in the appended claims are not necessarily limited to the specific features or steps described. Rather, the specific features and steps are disclosed as preferred forms of implementing the claimed inventive concepts.

What is claimed is:

1. A method comprising:

forming at least one thin-film layer over a first surface of a substrate;

forming an orifice layer over the thin-film layer, after said forming an orifice layer, forming an elongate slot between the first surface and a generally opposing second substrate surface, the slot having a long axis, wherein a cross-sectional view of the slot taken along the long axis defines a region proximate the first surface which approximates a portion of a trapezoid, wherein a longest side of the trapezoid is proximate the first surface; and patterning multiple holes in the orifice layer, at least some of the multiple holes being to aid in said act of forming the elongate slot and not primarily to eject fluid.

2. The method of claim 1, wherein said act of forming at least one thin-film layer comprises forming and patterning multiple thin-film layers.

3. The method of claim 2, wherein said act of forming at least one thin-film layer comprises patterning multiple holes in the thin-film layer arranged in a pattern which generally approximates a footprint of the slot at the first surface.

4. The method of claim 3, wherein said act of patterning multiple holes comprises patterning multiple holes having the same geometric shape.

5. The method of claim 1, wherein said act of forming an orifice layer comprises patterning multiple holes in the orifice layer and wherein the multiple holes are arranged as generally opposing pairs arranged in two generally parallel rows that are generally parallel to the long axis and wherein individual holes in the orifice layer are respectively aligned to be in fluid flowing relation with individual holes patterned in the thin-film layer.

6. The method of claim 1 further comprising prior to said act of forming an orifice layer, patterning a thick-film layer over the at least one thin-film layer to at least partially define individual firing chambers.

7. The method of claim 1, wherein said act of forming an orifice layer comprises forming an orifice layer having a first layer which defines various firing chambers, and a second layer configured to define individual nozzles for respective individual firing chambers.

8. A method comprising:

forming nozzles in the second sub-assembly layer where individual nozzles are respectively positioned in fluid-flowing relation to individual dummy features;

after said acts of patterning, forming a slot in the substrate, at least in part, by allowing an etchant to pass through the first and second sets of dummy features to the first surface.

9. The method of claim 8, wherein said act of forming comprises forming a slot having a tapered elevational profile that tapers inwardly from the first surface and wherein the first and second sets of dummy features are positioned over tapered portions of the slot.

10. The method of claim 8, wherein said act of patterning a first set of dummy features comprises patterning a first set of dummy features generally simultaneously to patterning multiple ink feed holes in the first layer.

11. The method of claim 8, wherein said act of patterning a first set of dummy features comprises patterning both the first set of dummy features and multiple ink feed holes in the first layer, and wherein the first set of dummy features and the ink feed holes are arranged in a pattern that approximates a slot footprint at the first surface, the first set of dummy features being positioned at opposite ends of the footprint, the ink feed holes being positioned between the first set of dummy features.

12. The method of claim 8, wherein said act of patterning a first set of dummy features comprises patterning a first set of dummy features positioned in a first group over a first end of a footprint of the slot, each dummy feature of the first group having a center, and a second group at a second generally opposing end of the footprint, each dummy feature of the second group having a center and wherein the centers of the first group of features and the centers of the second group of features are respectively arranged to define a triangle.

13. The method of claim 12, wherein said act of patterning the first group of features and the second group of features patterns the first end second groups of features so that the centers of each group define an isosceles triangle, and wherein each isosceles triangle is bisected by a line which is generally parallel to a long axis of the slot.

14. A method comprising:

patterning features into a first layer positioned over a first surface of a substrate; and, patterning features into a second layer positioned over the first layer, wherein at least some of the features formed by the acts of patterning are intended primarily to allow a slot to be formed in the substrate and not primarily to eject fluid, the slot being defined, at least in part, by at least one end wall of substrate material, the end wall having an endwall portion which intersects the first surface at an obtuse angle as measured through the substrate material.

15. The method of claim 14, wherein said act of patterning features into a second layer comprises patterning the features as dummy features and where the second layer is an orifice layer the method further comprising;

patterning nozzles in the orifice layer for ejecting fluid; and forming at least a portion of the slot by etching through the dummy features.

16. The method of claim 14 further comprising forming the slot by removing substrate material from a second surface of the substrate which is generally opposite the first surface and then exposing the substrate and the first and second layers to an etchant material to remove additional substrate material and wherein at least some of the etchant material reaches the first surface by passing through the features that are intended primarily to allow the slot to be formed in the substrate and not primarily to receive fluid from the slot.

17. The method of claim 16, wherein said act of removing comprises removing substrate material from multiple distinct regions of the second surface.

18. The method of claim 16, wherein said act of removing comprises patterning a hard mask on the second surface and etching through the hard mask.

19. The method of claim 16, wherein said act of removing comprises one or more of laser machining and sand drilling.

20. A method comprising:

where said act of forming the layer assembly comprises forming dummy features in a first sub-assembly positioned over the substrate and wherein the nozzles are formed in a second sub-assembly formed over the first sub-assembly and where individual nozzles are respectively positioned in fluid flowing relation to individual dummy features; and after said forming the layer assembly, forming the slot in the substrate.

21. A method comprising:

forming dummy features in at least a first sub-assembly layer formed over substrate and a second sub-assembly layer formed over the first sub-assembly layer, where the forming comprise forming nozzles in the second layer where individual nozzles are respectively positioned in fluid-flowing relation to individual dummy features; and forming a slot in the substrate, at least in part, by etching through the dummy features.

22. A method comprising:

forming features in a first layer formed over a substrate;

forming features in a second layer wherein individual features in the first and second layers are in fluid flowing relation but are not intended to contain fluid during a fluid ejection process; and applying an etchant that flows through one or more of the features in the second layer and through one or more of the features in the first layer to contact the substrate, the etchant removing portions of the substrate to form at least part of a slot in the substrate.

* * * * *

UNITED STATES PATENT AND TRADEMARK OFFICE

CERTIFICATE OF CORRECTION

PATENT NO. : 7,549,224 B2
APPLICATION NO. : 11/450572
DATED : June 23, 2009
INVENTOR(S) : Jeffrey S. Obert et al.

It is certified that error appears in the above-identified patent and that said Letters Patent is hereby corrected as shown below:

In column 1, line 28, delete “fort” and insert -- for --, therefor.

In column 5, line 16, delete “13” and insert -- $l_3$ --, therefor.

In column 8, line 65, delete “comers” and insert -- corners --, therefor.

In column 9, line 58, in Claim 8, after “features;” insert -- and, --.

In column 10, line 25, in Claim 13, delete “end” and insert -- and --, therefor.

In column 10, line 44, in Claim 15, delete “layer” and insert -- layer, --, therefor.

In column 11, line 5, in Claim 20, delete “and” and insert -- and, --, therefor.

In column 11, line 15, in Claim 21, delete “and” and insert -- and, --, therefor, Signed and Sealed this Twenty-seventh Day of October, 2009

David J. Kappos

*Director of the United States Patent and Trademark Office*